(12) United States Patent
Bruce

(10) Patent No.: US 6,585,330 B2
(45) Date of Patent: Jul. 1, 2003

(54) WHEEL COVER HAVING CONCEALED SNAP-FIT RETENTION STRUCTURE

(75) Inventor: Jeff Bruce, Wayland, MI (US)

(73) Assignee: Lacks Industries, Inc., Grand Rapids, MI (US)

( * ) Notice: Subject to any disclaimer, the term of this patent is extended or adjusted under 35 U.S.C. 154(b) by 0 days.

(21) Appl. No.: 09/815,526

(22) Filed: Mar. 23, 2001

(65) Prior Publication Data

US 2003/0090143 A1 May 15, 2003

(51) Int. Cl.[7] ................................................. B60B 7/14
(52) U.S. Cl. .............................. 301/37.372; 301/37.373; 301/37.374
(58) Field of Search ....................... 301/37.371, 37.372, 301/37.373, 37.374, 37.375, 37.376, 37.31

(56) References Cited

U.S. PATENT DOCUMENTS

| | | |
|---|---|---|
| 4,123,111 A | 10/1978 | Renz et al. |
| 4,316,638 A | 2/1982 | Spisak |
| 4,357,053 A * | 11/1982 | Spisak ................... 301/37.371 |
| 4,382,635 A | 5/1983 | Brown et al. |
| 4,457,560 A | 7/1984 | Rowe et al. |
| 4,547,021 A | 10/1985 | Abbate Daga |
| 4,576,415 A | 3/1986 | Hempelmann |
| 4,699,434 A | 10/1987 | Hempelmann |
| 4,842,339 A | 6/1989 | Roulinson |
| 4,895,415 A | 1/1990 | Stay et al. |
| 4,998,780 A | 3/1991 | Eshler et al. |
| 5,046,784 A | 9/1991 | Carter, III |
| 5,163,739 A | 11/1992 | Stanlake |
| 5,188,428 A | 2/1993 | Carter, III |
| 5,297,854 A | 3/1994 | Nielsen et al. |
| 5,494,336 A * | 2/1996 | Russell ................... 301/37.371 |
| 5,520,445 A | 5/1996 | Toth |
| 5,707,113 A * | 1/1998 | Russell ................... 301/37.371 |
| 5,752,794 A | 5/1998 | Krawczak |
| 5,842,749 A | 12/1998 | DiMarco |
| 6,003,955 A | 12/1999 | Ladd |
| 6,022,081 A | 2/2000 | Hauler et al. |
| 6,135,570 A * | 10/2000 | Wieczorek ............. 301/37.371 |
| 6,196,637 B1 * | 3/2001 | Hou et al. ............. 301/37.371 |
| 6,238,007 B1 * | 5/2001 | Wieczorek et al. .... 301/37.371 |

* cited by examiner

Primary Examiner—S. Joseph Morano
Assistant Examiner—Long Bao Nguyen
(74) Attorney, Agent, or Firm—VanOphem & VanOhpem, P.C.

(57) ABSTRACT

A wheel cover snap fastens to stylized lug nuts of a wheel using resilient retainers that are integrally fastened to the wheel cover. The stylized lug nuts correspond and axially extend through apertures in the wheel cover when the wheel cover is assembled to the wheel. The retainers are secured to an inboard face of the wheel cover and correspondingly engage the stylized lug nuts to retain the wheel trim assembly to the wheel such that retainers are not visible when the wheel trim assembly is viewed from a direction normal to the outboard face of the wheel cover. The apertures are sized in relation to annular flanges on the lug nuts and to the resilient tabs of the retainers such that the wheel cover and/or annular flanges of the lug nuts conceal the retainers from view, and thereby provide an uninterrupted chrome appearance.

15 Claims, 3 Drawing Sheets

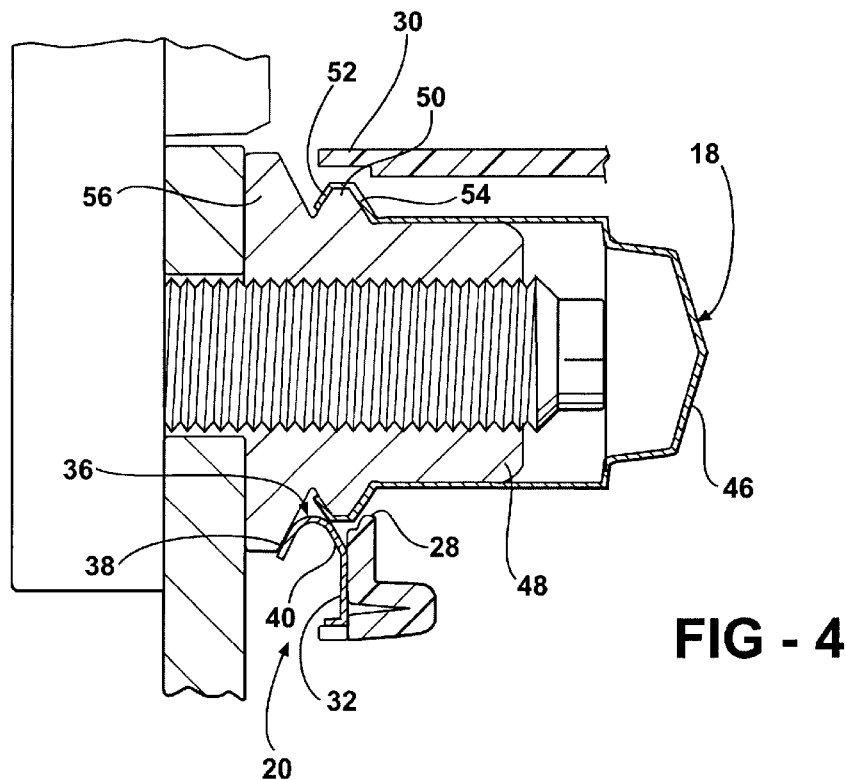
FIG - 4
FIG - 5
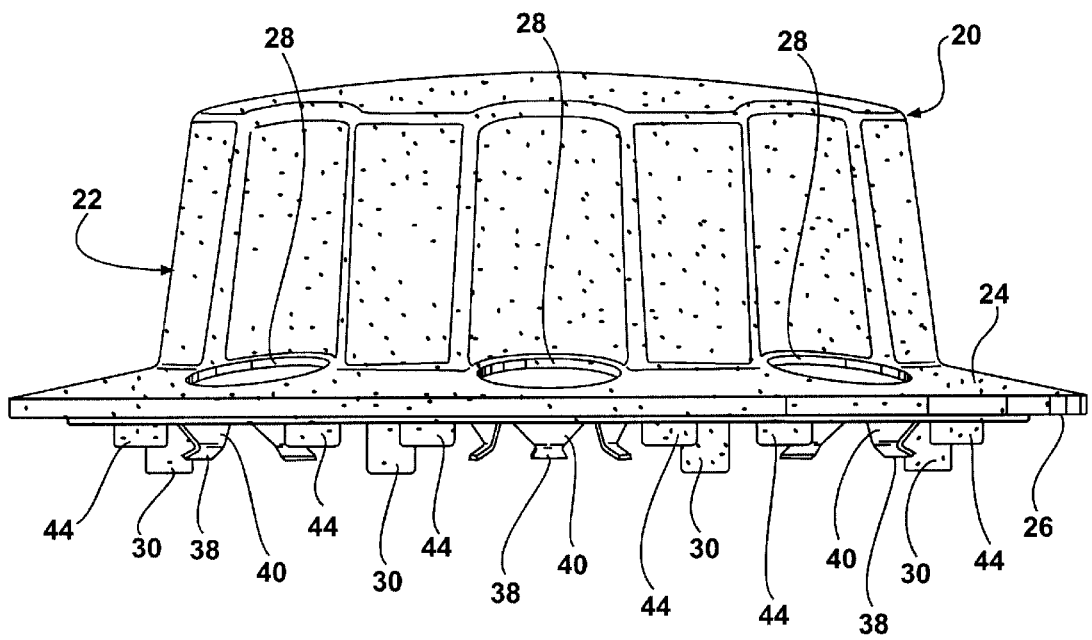

WHEEL COVER HAVING CONCEALED SNAP-FIT RETENTION STRUCTURE

CROSS-REFERENCES TO RELATED APPLICATIONS

Not applicable.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to decorative wheel trim components for use on vehicle wheels. More particularly, this invention relates to an improved retention structure for holding a wheel trim component to a vehicle wheel having stylized lug nuts, wherein the retention structure is not visible once the wheel trim component is snap-fastened to the vehicle wheel.

2. Description of the Related Art

Wheel trim components such as hubcaps and full-face wheel covers are often used to adorn a vehicle wheel for improved aesthetic appearance. As such, it is very important that certain unattractive functional features, such as retention elements, are not visible once the wheel trim component is fastened to the vehicle wheel.

Plastic wheel covers are increasingly being used in the automotive industry to adorn vehicle wheels by attaching them to lug nuts of the vehicle wheel. Unfortunately, due to heat from braking the vehicle, wheel and lug nut temperatures are often too high to be directly connected to standard plastic material. Therefore, many vehicle wheel applications necessitate use of an intermediate fastener disposed between the plastic wheel cover and the lug nuts, so as to insulate the plastic from the heat of the lug nuts, and provide a snap fit of the wheel cover to the lug nuts.

For example, U.S. Pat. No. 4,316,638 to Spisak teaches a retaining arrangement for holding a wheel trim assembly on a wheel, wherein resiliency of the retaining arrangement is effective to hold the wheel trim to the wheel and to hold the retaining arrangement in place on the wheel trim. Spisak discloses a plastic cup-shaped trim member having spring-like metal retainers fastened thereto. The trim member connects to a vehicle wheel having lug nuts extending therefrom. The trim member includes axial openings therethrough that correspond to the lug nuts. Associated with each axial opening is a radial pocket formed on an inside wall of the trim member. Each pocket securely retains a metal retaining element that extends radially outwardly through the associated radial opening. Each metal retaining element terminates in a blade portion that is adapted to bitingly engage its respective lug nut. Unfortunately, each metal retaining element is necessarily visible when the wheel trim mounted to the wheel is viewed normally thereto.

Furthermore, U.S. Pat. No. 4,457,560 to Rowe et al. teaches a plastic hubcap having metal retention structure for attachment to decorative lug nuts. Rowe et al. recognize that it may be desirable to leave decorative lug nuts exposed in conjunction with a hubcap, but that such exposed fasteners impose design restrictions on incorporating metal retention structure by which the hubcap is retained to the wheel. As a solution, Rowe et al. disclose a metal retention element secured to the underside of a plastic hubcap with lanced tabs formed in the retention element that engage plastic pins integrally projecting from the underside of the plastic hubcap. The metal retention element includes retention tabs arranged in a pattern that corresponds to the pattern of decorative lug nuts that project through apertures in the plastic hubcap. The retention tabs retentively engage respective decorative lug nuts. Each retention tab is of circular contour coextensive with a radially inner edge of the corresponding aperture and engages a radially inner periphery of the respective decorative lug nut. Unfortunately, the retention tabs of Rowe et al. are necessarily visible when the wheel trim, as mounted to the wheel, is viewed normally thereto.

For the very same reason that it is desirable to leave decorative lug nuts exposed to view when a wheel trim component is mounted to a wheel, it is not at all desirable to leave a purely functional retaining element exposed. Such an exposed arrangement of retention structure actually detracts from, rather than enhances, the overall aesthetic appearance of the vehicle wheel. This is particularly problematic since the metal retention structure involves use of spring steel that is usually very dark in appearance, in contrast to the adjacent bright chrome lug nuts. Unfortunately, both Spisak and Rowe et al. leave such metal retention structure exposed to view.

From the above, it can be appreciated that the metal retention structure for use with plastic hubcaps of the prior art is not fully optimized for use with exposed decorative lug nuts extending through apertures of a wheel trim component. Therefore, what is needed is a plastic wheel trim component that concealingly integrates metal retention structure for attachment to decorative lug nuts, such that an uninterrupted chrome appearance is provided.

BRIEF SUMMARY OF THE INVENTION

According to the preferred embodiment of the present invention, there is provided a wheel trim assembly for use in combination with a wheel that has lug nuts extending in an axially outboard direction therefrom. The wheel trim assembly includes a wheel cover having an inboard face facing the wheel, and an array of apertures extending through the wheel cover. The apertures correspond to the lug nuts such that the lug nuts align with and extend axially through the apertures when the wheel cover is assembled to the wheel. Retainers are secured to the inboard face of the wheel cover and have resilient tabs arranged approximately concentric with each corresponding apertur& of the wheel cover. The resilient tabs extend radially inwardly toward the center of each corresponding aperture and extend axially inboard from the inboard face of the wheel cover. As the wheel trim assembly is assembled to the lug nuts of the wheel, the resilient tabs engage the corresponding lug nuts to retain the wheel trim assembly to the wheel such that the retainers are not visible when the wheel trim assembly is viewed from a direction normal to the outboard face of the wheel cover. Furthermore, the apertures are sized in relation to annular flanges on the lug nuts and to the resilient tabs of the retainers such that the retainers are concealed from view and therefore a continuous chrome appearance is achieved.

It is an object of the present invention to provide a wheel cover that permits display of decorative lug nuts therethrough.

It is another object to provide a wheel cover that attaches to decorative lug nuts of a wheel in a manner that exposes the decorative lug nuts to view.

It is a still another object to provide a wheel cover assembly that removably snap-fastens to decorative lug nuts of a wheel using a resilient retainer integrally fastened to a wheel cover, wherein the resilient retainer is concealed by the wheel cover and is not exposed to view.

These objects and other features, aspects, and advantages of this invention will be more apparent after a reading of the following detailed description, appended claims, and accompanying drawings.

BRIEF DESCRIPTION OF THE SEVERAL VIEWS OF THE DRAWINGS

FIG. 4 ia a cross-sectional view of a portion of the wheel trim assembly that is secured to a decorative lug nut;

FIG. 5 is a side view of the wheel trim assembly shown in FIG. 1; and

DETAILED DESCRIPTION OF THE PREFERRED EMBODIMENT

Figure 1:
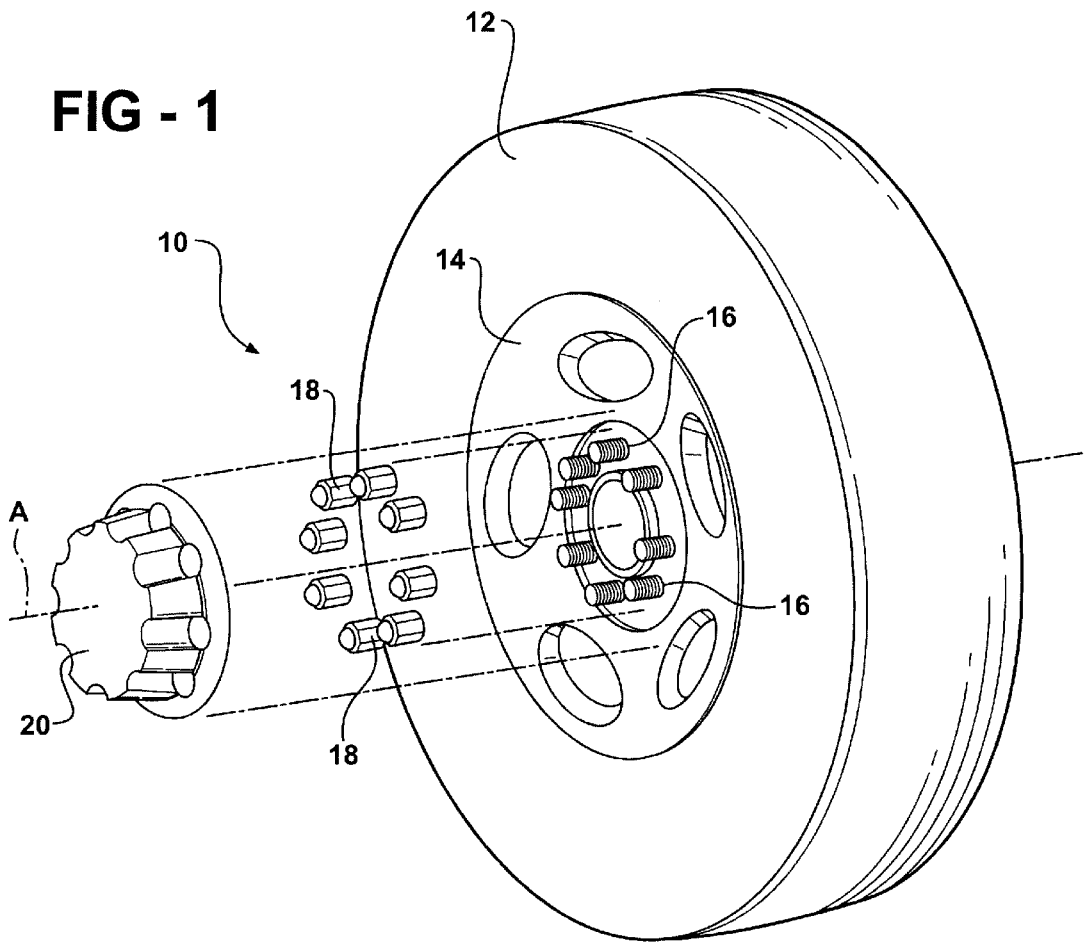
FIG. 1 is an exploded perspective view of a wheel assembly illustrating a wheel trim assembly according to the preferred embodiment of the present invention.

Referring now in detail to the Figures, there is shown in FIG. 1 a wheel assembly 10 including a tire 12 and a wheel 14, wherein the wheel 14 has lug studs 16, and lug nuts 18 fastened to the lug studs 16. A wheel trim assembly 20 attaches to the lug nuts 18 according to the preferred embodiment of the present invention that will be described in detail below. The wheel 14 is preferably decorative in appearance and, preferably, is chrome plated or skinned. As is well known in the art, the lug studs 16 are uniformly arranged in a circular array centered about the central axis A of the wheel assembly 10. The lug nuts 18 are preferably decorative in appearance, and threadingly fasten to the lug studs 16, as is well known in the art. The wheel trim assembly 20 snap fits to the lug nuts 18 to removably retain the wheel trim assembly 20 to the wheel 14 whereby a complete decorative appearance is provided across the wheel 14, lug nuts 18, and wheel trim assembly 20.

As best shown in FIG. 5, the wheel trim assembly 20 includes a wheel cover or hubcap 22 made from any appropriate wheel cover material but preferably from a chrome-platable plastic such as polycarbonate/acrylonitrilebutadiene-styrene (PC/ABS). An outboard face 24 is painted or preferably chrome plated for decorative aesthetic appearance. An inboard face 26 is disposed opposite the outboard face 24 and faces the wheel 14 when assembled to the lug nuts 18 of the wheel 14. Apertures 28 extend through the wheel cover 22 between the inboard and outboard faces 26 and 24.

Figure 2:
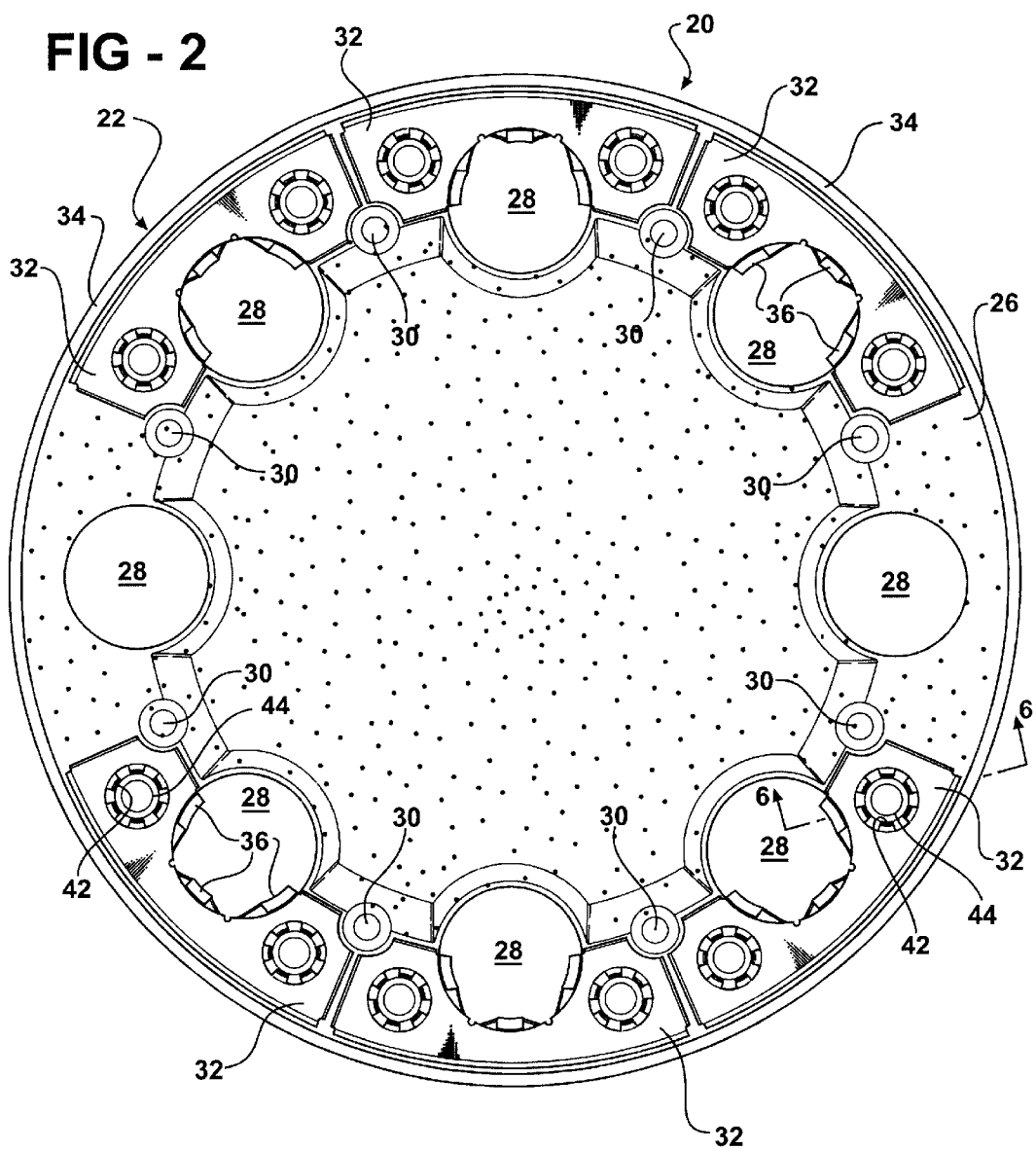
FIG. 2 is an inboard view of an inboard face of the wheel trim assembly of FIG. 1.

As best shown in FIG. 2, the apertures 28 are arranged in a circular array that corresponds to the circular array of the lug studs 16 and lug nuts 18 of FIG. 1, such that the lug nuts 18 visibly extend through the apertures 28 when the wheel trim assembly 20 is assembled to the lug nuts 18 of the wheel 14. The wheel cover 22 further includes standoffs 30 disposed proximate each aperture 28 for limiting axial travel of the wheel trim assembly 20 as it is assembled to the wheel 14.

The wheel trim assembly further includes retainers 32 attached to the inboard face 26 of the wheel cover 22 proximate the apertures 28. The retainers 32 are preferably stamped and formed from a resilient spring steel, but alternatively can be formed from a separate high temperature resistant plastic, such as is disclosed in copending application Ser. No. 09/522,023 assigned to the assignee hereof, that is fully incorporated by reference herein. Additionally, the retainers 32 can simply be integral extensions extending from the inboard face 26 of the wheel cover 22 itself, such that the wheel trim assembly 20 would be an integral one-piece component. Preferably, at least three individual retainers 32 are correspondingly disposed about at least three apertures 28 of the wheel cover 22, but, as will be apparent to one skilled in the art, more or less retainers 32 may be used and can alternatively be integrated into a larger one-piece or two-piece retainer for ease of assembly to the wheel cover 22.

Figure 3:
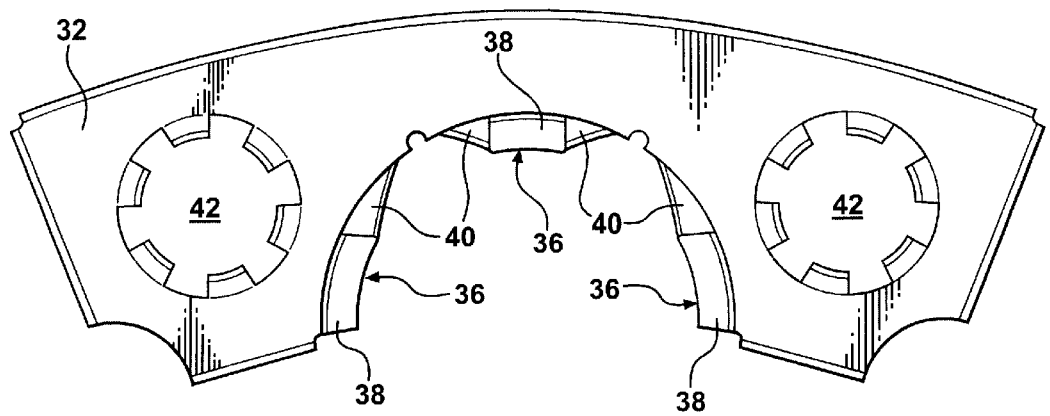
FIG. 3 is an inboard view of a retainer according to the preferred embodiment of the present invention.
Figure 6:
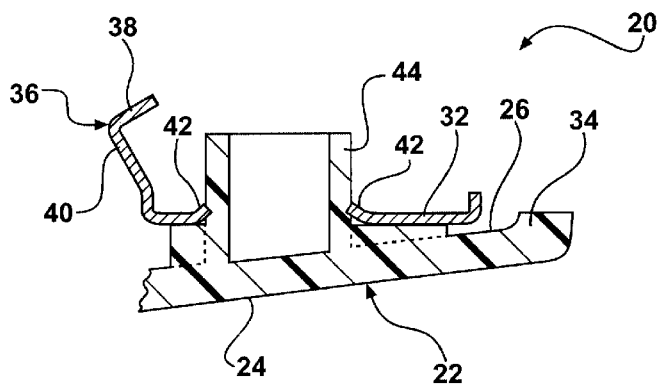
FIG. 6 is a cross-section of the wheel trim assembly as shown in FIG. 2 taken along lines 6—6 thereof.

As shown, six retainers 32 are correspondingly disposed about six of eight apertures 28, and are disposed just inside of an annular lip 34 of the wheel cover 22. Each retainer 32 preferably includes three resilient tabs 36 although more or less may be used. The resilient tabs 36 are approximately concentrically disposed about an approximate 180-degree circumferential span of each corresponding aperture 28, such that the resilient tabs 36 follow the contour of a portion of each aperture 28. Each resilient tab 36 extends radially inwardly toward the center of each corresponding aperture 28. In other words, the resilient tabs 36 have a circular contour that is coextensive with a circumferential portion of the corresponding aperture 28. Each resilient tab 36 is bent in such a fashion as to define an engagement leg 38 and a retention leg 40, as best shown in FIGS. 3, 5, and 6.

Referring again to FIG. 2, each retainer 32 is secured to the wheel cover 22 using a well known tinnerman-style fastening arrangement. Each retainer 32 includes a tabbed aperture 42 that aligns with and integrally fastens to a corresponding integral boss 44 extending axially inboard from the inboard face 26 of the wheel cover 22. Accordingly, each retainer 32 is individually assembled to the inboard face 26 of the wheel cover 22 by aligning the resilient tabs 36 with a corresponding aperture 28, further aligning the tabbed aperture 42 with the corresponding integral boss 44, and finally urging the retainer 32 against the inboard face 26 of the wheel cover 22 to interlock the tabbed apertures 42 to the integral bosses 44. As best shown in FIG. 6, and as is well known with tinnerman-style integral fasteners, the retainers 32 will easily assemble to the integral bosses 44 of the wheel cover 22 but will strongly resist As best shown in FIG. 4, the wheel trim assembly 20 is integrally snap fastened to the lug nuts 18. The lug nuts 18, as illustrated, are merely exemplary components for use with the present invention. The lug nuts 18 are composed of a two-piece construction wherein an outer decorative cap 46 of stainless steel, chrome plated plastic or the like, is disposed over an outer free end of a lug nut body 48 and is secured thereto by crimping. The lug nut 18 includes an annular flange portion 50 therearound for communicating with the retainers 32 of the wheel trim assembly 20. The annular flange portion 50 includes an inboard surface 52 and an oppositely disposed outboard surface 54. The wheel trim assembly 20 is assembled to the wheel 14 by aligning the apertures 28 of the wheel cover 22 with the corresponding lug nuts 18 and then urging the wheel trim assembly 20 into engagement with the lug nuts 18.

Initially, the engagement leg 38 of each resilient tab 36 of each retainer 32 comes into contact with the outboard surface 54 of the corresponding lug nut annular flange portion 50. The wheel trim assembly 20 is further urged against the wheel 14 such that the resilient tabs 36 deflect radially outwardly with respect to each aperture 28. The effective inner diameter defined by the resilient tabs 36 of the retainers 32 is slightly smaller than the effective outer diameter defined by the annular flange portions 50 of the lug nuts 18. The wheel trim assembly 20 is still further urged against the wheel 14 such that the resilient tabs 36 pass over the annular flange portion 50 of the respective lug nut 18 and rebound radially inwardly behind the annular flange portion 50, such that the retention leg 40 rests behind, or against the inboard surface 52 of the annular flange portion 50, and the engagement leg 38 rests against an annular base 56 of the lug nut. The standoffs 30 prevent overtravel of the wheel trim assembly 20 by bottoming out against the annular base 56 of the lug nuts 18 or against the outboard surface of the wheel 14 in order to prevent damage to the wheel trim assembly 20.

The retainers 32 are dimensioned in relation to the lug nuts 18 such that upon assembly of the wheel trim assembly 20 to the lug nuts 18, a resilient interference fit is established between the resilient tabs 36 and the annular flange portions 50 of the lug nuts 18. The resiliency of the resilient tabs 36 exerts a constant load on the lug nuts 18 to tightly retain the wheel trim assembly 20 on the wheel 14. Accordingly, the wheel trim assembly 20 is resiliently retained to the lug nuts 18 proximate the wheel 14, wherein a portion of each retainer 32 is resiliently trapped between the annular base 56 and annular flange portion 50 of each corresponding lug nut 18 to prevent the wheel trim assembly 20 from rattling.

The diameter of each aperture 28 is dimensioned such that it is smaller than the diameter of the corresponding lug nut annular flange portion 50 so that there is no gap therebetween but, rather, an overlap condition therebetween. Additionally, the resilient tabs 36 are concealingly disposed behind the annular flange portion 50 of the respective lug nut 18. As such, a continuous chrome appearance across the entire wheel trim assembly 20 and lug nuts 18 is thereby provided. Accordingly, the retainers 32 are not visible when the wheel assembly 10 is viewed from a direction normal to the outboard face 24 of the wheel cover 22.

The wheel trim assembly 20 may be removed from the lug nuts 18 in either of two ways. First, the lug nuts 18 may be loosened and removed from the lug studs 16 to free up the wheel trim assembly 20. Second, and more preferably, the wheel trim assembly 20 can be removed by inserting a tool between the wheel trim assembly 20 and the wheel 14 to pry the wheel trim assembly 20 off without loosening the lug nuts.

While the present invention has been described in terms of a preferred embodiment, it is apparent that other forms could be adopted by one skilled in the art. Those skilled in the art will appreciate that other applications, including those outside of the automotive industry, are possible with this invention. Accordingly, the scope of the present invention is to be limited only by the following claims.

What is claimed is:

1. A wheel trim assembly for use in combination with a wheel, said wheel having at least one lug nut extending axially outboard therefrom, said wheel trim assembly comprising:

a wheel cover having an inboard face facing in a direction toward said wheel, and at least one aperture extending through said wheel cover, said at least one aperture being complementarily adapted to receive said at least one lug nut such that said at least one lug nut extends axially through said at least one aperture when said wheel cover is assembled to said wheel; and means for retaining said wheel cover to said at least one lug nut, said retainer means mounted to said inboard face of said wheel cover and extending in an inboard direction therefrom, said retainer means having at least one resilient tab disposed about said at least one aperture of said wheel cover, said at least one resilient tab having a portion projecting radially inwardly toward the center of said at least one aperture, said portion of said at least one resilient tab engaging said at least one lug nut to retain said wheel trim assembly to said wheel such that said means for retaining is not visible when said wheel trim assembly is viewed from a direction normal to said outboard face of said wheel cover.

2. The wheel trim assembly as claimed in claim 1, wherein said wheel cover comprises at least one integral boss extending inboard from said inboard face of said wheel cover, and said retainer means comprising a tabbed aperture for engaging said at least one integral boss of said wheel cover in an interference fit to secure said retaining means to said wheel cover.

3. The wheel trim assembly as claimed in claim 1, wherein each resilient tab of said at least one resilient tab is bent so as to form an engagement leg and a retention leg disposed axially outboard of said engagement leg, such that when said wheel trim assembly is aligned with and urged toward said wheel said engagement leg initially engages said at least one lug nut, said retention and engagement legs deflect radially outwardly with respect to the center of said at least one aperture, and said retention and engagement legs resiliently rebound radially inwardly such that said retention leg snaps into engagement with a portion of said at least one lug nut to retain said wheel cover to said wheel.

4. The wheel trim assembly as claimed in claim 1, wherein said wheel cover further comprises at least one standoff extending axially inboard from said inboard face of said wheel cover, said at least one standoff limiting axial travel of said wheel trim assembly to prevent overtravel and related damage to said wheel trim assembly as said wheel trim assembly is urged toward said wheel.

5. The wheel trim assembly as claimed in claim 1, wherein said retainer means is disposed radially outward of said at least one aperture in relation to the center of said wheel trim assembly.

6. The wheel trim assembly as claimed in claim 1, wherein said wheel cover is composed of a chrome platable plastic and said retainer is composed of a spring steel.

7. A wheel trim assembly for use with a wheel, said wheel having at least one lug nut extending axially outboard therefrom, said at least one lug nut having a flange portion thereon, said wheel trim assembly comprising:

a wheel cover having an inboard face facing in a direction toward said wheel, an outboard face opposite said inboard face, and at least one aperture extending therethrough and being complementarily adapted to receive said at least one lug nut such that said at least one lug nut extends axially through said at least one aperture when said wheel cover is assembled to said wheel;

at least one retainer mounted to said inboard face of said wheel cover, said at least one retainer having a plurality of resilient tabs disposed approximately concentric with said at least one aperture of said wheel cover, said plurality of resilient tabs having a portion projecting radially inwardly toward the center of said at least one aperture, said plurality of resilient tabs extending axially inboard from said inboard face of said wheel cover, said plurality of resilient tabs engaging said flange portion of said at least one lug nut to retain said wheel trim assembly to said wheel; and means for securing said at least one retainer to said inboard face of said wheel cover;

whereby said wheel trim assembly assembles to said wheel when said wheel trim assembly is aligned with and urged toward said wheel, wherein said plurality of resilient tabs engage said flange portion of said at least one lug nut and deflect radially outwardly with respect to the center of said at least one aperture, said plurality of resilient tabs resiliently rebounding radially inwardly behind said flange portion to engage said flange portion in a resilient interference fit for detachably retaining said wheel trim assembly to said wheel such that said at least one retainer is not visible when said wheel trim assembly is viewed from a direction normal to said outboard face of said wheel cover.

8. The wheel trim assembly as claimed in claim 7, wherein said means for securing comprises:

at least one integral boss extending inboard from said inboard face of said wheel cover; and at least one tabbed aperture disposed in said at least one retainer, said at least one tabbed aperture engaging said at least one integral boss in an interference fit.

9. The wheel trim assembly as claimed in claim 7, wherein each resilient tab of said plurality of resilient tabs is bent to form an engagement leg and a retention leg disposed axially outboard of said engagement leg, such that when said wheel trim assembly is aligned with and urged toward said wheel said engagement leg initially engages said flange portion of said at least one lug nut, said retention and engagement legs deflect radially outwardly with respect to the center of said at least one aperture, and said retention and engagement legs resiliently rebound radially inwardly such that said retention leg snaps into engagement behind said flange portion to retain said wheel cover to said wheel.

10. The wheel trim assembly as claimed in claim 7, wherein said wheel cover further comprises at least one standoff extending axially inboard from said inboard face of said wheel cover, said at least one standoff limiting axial travel of said wheel trim assembly to prevent overtravel and related damage to said wheel trim assembly as said wheel trim assembly is urged toward said wheel.

11. The wheel trim assembly as claimed in claim 7, wherein said at least one retainer is disposed radially outward of said at least one aperture in relation to the center of said wheel trim assembly.

12. A wheel trim assembly for use with a wheel, said wheel having at least one lug nut extending axially outboard therefrom, said at least one lug nut having an annular flange therearound, said wheel trim assembly comprising:

a wheel cover having an inboard face facing said wheel, an outboard face opposite said inboard face, and at least one aperture extending therethrough, said at least one lug nut extending axially through said at least one aperture when said wheel cover is assembled to said wheel, said at least one aperture having an inside diameter smaller than said outside diameter of said annular flange of said at least one lug nut;

at least one retainer mounted to said inboard face of said wheel cover, said at least one retainer having a plurality of resilient tabs disposed approximately concentric with said at least one aperture of said wheel cover, said plurality of resilient tabs facing radially inwardly toward the center of said at least one aperture, said plurality of resilient tabs extending axially inboard from said inboard face of said wheel cover, said plurality of resilient tabs engaging said annular flange of said at least one lug nut to retain said wheel trim assembly to said wheel; and means for securing said at least one retainer to said inboard face of said wheel cover;

whereby said wheel trim assembly assembles to said wheel when said wheel trim assembly is aligned with and urged toward said wheel, said plurality of resilient tabs engage said annular flange of said at least one lug nut and deflect radially outwardly with respect to the center of said at least one aperture, and said plurality of resilient tabs resiliently rebound radially inwardly behind said annular flange to engage said annular flange in a resilient interference fit for detachably retaining said wheel trim assembly to said wheel such that said at least one retainer is disposed behind said annular flange radially outside of said inside diameter of said at least one aperture to hide said at least one retainer when said wheel trim assembly is viewed from a direction normal to said outboard face of said wheel cover.

13. The wheel trim assembly as claimed in claim 12, wherein said means for securing comprises:

at least one integral boss extending inboard from said inboard face of said wheel cover;

at least one tabbed aperture disposed in said at least one retainer for engaging said at least one integral boss of said wheel cover in an interference fit.

14. The wheel trim assembly as claimed in claim 12, wherein each resilient tab of said plurality of resilient tabs is bent to form an engagement leg and a retention leg disposed axially outboard of said engagement leg, such that when said wheel trim assembly is aligned with and urged toward said wheel said engagement leg initially engages said annular flange of said at least one lug nut, said retention and engagement legs deflect radially outwardly with respect to the center of said at least one aperture, and said retention and engagement legs resiliently rebound radially inwardly such that said retention leg snaps into engagement behind said annular flange to retain said wheel cover to said wheel.

15. The wheel trim assembly as claimed in claim 12, wherein said wheel cover further comprises at least one standoff extending axially inboard from said inboard face of said wheel cover, said at least one standoff limiting axial travel of said wheel trim assembly to prevent overtravel and related damage to said wheel trim assembly as said wheel trim assembly is urged toward said wheel.

* * * * *

UNITED STATES PATENT AND TRADEMARK OFFICE
CERTIFICATE OF CORRECTION

PATENT NO. : 6,585,330 B2
DATED : July 1, 2003
INVENTOR(S) : Jeff Bruce

It is certified that error appears in the above-identified patent and that said Letters Patent is hereby corrected as shown below:

Title page,
Item [74], *Attorney, Agent, or Firm*, delete "VanOhpem" and insert -- VanOphem --.

Column 2,
Line 52, kindly delete "apertur&" and insert -- aperture --.

Column 3,
Line 19, kindly delete "." at the end of the sentence and insert -- ; --.
Line 55, kindly delete "acrylonitrilebutadiene-styrene" and insert -- acrylonitrile-butadiene-styrene --.

Column 4,
Line 51, after "resist", kindly insert -- disassembly therefrom, since the retainers 32 bitingly engage the integral bosses 44. --.

Signed and Sealed this

Twenty-ninth Day of June, 2004

JON W. DUDAS
*Acting Director of the United States Patent and Trademark Office*